(12) United States Patent
Wilke

(10) Patent No.: US 6,774,177 B1
(45) Date of Patent: Aug. 10, 2004

(54) ELECTRICALLY CONDUCTING HYDROPRIMER FOR PLASTICS

(75) Inventor: Guido Wilke, Münster (DE)

(73) Assignee: BASF Coatings AG, Munster (DE)

( * ) Notice: Subject to any disclaimer, the term of this patent is extended or adjusted under 35 U.S.C. 154(b) by 253 days.

(21) Appl. No.: 10/089,482

(22) PCT Filed: Oct. 5, 2000

(86) PCT No.: PCT/EP00/09754

§ 371 (c)(1), (2), (4) Date: Mar. 28, 2002

(87) PCT Pub. No.: WO01/27211

PCT Pub. Date: Apr. 19, 2001

(30) Foreign Application Priority Data

Oct. 9, 1999 (DE) .......................... 199 48 821

(51) Int. Cl.$^7$ ............................. C08J 3/00; C08K 3/20; C08L 75/00; B05D 3/02; B32B 27/00

(52) U.S. Cl. ................. 524/591; 427/372.2; 427/385.5; 428/423.1; 524/839; 524/840

(58) Field of Search ................................. 524/591, 839, 524/840; 428/423.1; 427/372.2, 385.5

(56) References Cited

U.S. PATENT DOCUMENTS

| | | | |
|---|---|---|---|
| 4,489,135 A | 12/1984 | Drexler et al. | 428/423.1 |
| 4,851,460 A | 7/1989 | Stranghöner et al. | 523/407 |
| 4,880,867 A | 11/1989 | Gobel et al. | 524/507 |
| 4,914,148 A | 4/1990 | Hille et al. | 524/507 |
| 4,945,128 A | 7/1990 | Hille et al. | 524/591 |
| 5,075,372 A | 12/1991 | Hille et al. | 524/839 |
| 5,334,420 A | 8/1994 | Hartung et al. | 427/407.1 |
| 5,342,882 A | 8/1994 | Göbel et al. | 524/832 |
| 5,368,944 A | 11/1994 | Hartung et al. | 428/423.1 |
| 5,370,190 A | 12/1994 | Bigham | 172/40 |
| 5,370,910 A | 12/1994 | Hille et al. | 427/407.1 |
| 5,569,705 A | 10/1996 | Vogt-Birnbrich et al. | 524/591 |
| 5,571,861 A | 11/1996 | Klein et al. | 524/591 |
| 5,601,880 A | 2/1997 | Schwarte et al. | 427/407.1 |
| 5,654,391 A | 8/1997 | Göbel et al. | 528/71 |
| 5,691,425 A | 11/1997 | Klein et al. | 525/455 |
| 5,696,196 A | 12/1997 | DiLeo | 524/445 |
| 5,760,128 A | 6/1998 | Baltus et al. | 524/591 |
| 6,001,424 A | 12/1999 | Lettmann et al. | 427/407.1 |
| 6,001,915 A | 12/1999 | Schwarte et al. | 524/457 |

FOREIGN PATENT DOCUMENTS

| | | | |
|---|---|---|---|
| CA | 2073115 | 7/1992 | ......... C09D/175/14 |
| CA | 2073814 | 7/1992 | ......... C09D/163/00 |
| CA | 2078650 | 10/1992 | ......... C09D/133/00 |
| CA | 2104845 | 8/1993 | ......... C09D/161/00 |
| CA | 2102170 | 5/1994 | ......... C09D/133/00 |
| CA | 2127761 | 7/1994 | ......... C09D/175/04 |
| CA | 2240674 | 10/1997 | ......... C09D/175/04 |
| CA | 2102169 | 11/2001 | ......... C09D/175/14 |
| DE | 19644615 | 3/1998 | |
| EP | 299148 | 4/1988 | ........... C08G/18/08 |
| EP | 354261 | 8/1988 | ........... C08G/18/50 |
| EP | 394737 | 4/1990 | ......... C09D/175/06 |
| EP | 401565 | 5/1990 | ............. C09D/5/02 |
| EP | 424705 | 10/1990 | ......... C08F/283/00 |
| EP | 590484 | 9/1993 | ........... C08G/18/08 |
| WO | WO92/17546 | 10/1992 | ........... C08L/75/04 |
| WO | WO9514721 | 6/1995 | ......... C08F/290/14 |
| WO | WO9612747 | 5/1996 | ......... C08F/285/00 |
| WO | WO97/9747 | 12/1997 | ........... C08G/18/75 |
| WO | WO97/49745 | 12/1997 | ........... C08G/18/08 |

OTHER PUBLICATIONS

English Abstract for DE4328092.
English Abstract for EP593454.
English Abstract for EP297576.
English Abstract on front pages of the International Publication WO96/12747.
English Abstract on front pages of the International Publication WO95/14721.
Database WPI, Section Ch, Week 199339, Derwent Publications Ltd., London, GB, NA 1993–306189, XP002160053.
Database WPI, Section Ch, Week 198723, Derwent Publications Ltd., London, GB, NA 1997–160457, XP002160054.
BASF Lacke + Farben AG. et al., PCT/EP94/01956, entitled Process for the preparation of polyurethane resins and their use and the use of ethoxyethyl prepionate for the preparation of polyurethane resins.

*Primary Examiner*—Patrick D. Niland

(57) ABSTRACT

An electrically conductive hydroprimer for plastics comprising I) at least one component comprising at least one aqueous polyurethane dispersion and at least one electrically conductive pigment; and II) at least one component comprising at least one polyisocyanate, wherein at least one of the components I and II comprise at least one aromatic solvent. Also, the use of the hydroprimer for producing multi-coat color and/or effect paint systems for plastic components and plastic components coated with the multi-coat paint systems.

15 Claims, No Drawings

ELECTRICALLY CONDUCTING HYDROPRIMER FOR PLASTICS

This application is a National Phase Application of Patent Application PCT/EP00/09754 filed on Oct. 05, 2000.

The present invention relates to a novel electrically conductive hydroprimer (water based primer) for plastics. The present invention further relates to a novel process for painting plastics.

In industry nowadays the use is on the increase of plastic based moldings which are used together with metal parts and which require a paint finish. This is true particularly of automotive parts, which are increasingly being manufactured from plastics parts, such as, for example bumper fascias, spoilers, sills, wheel arch linings and side trims or protection strips.

In order to improve the impact strength, especially the low temperature impact strength, these plastics include hydrophobic oligomeric rubbers, which are fundamentally incompatible with aqueous paints. These rubbers contribute to the formation of a hydrophobic boundary layer between hydroprimer and plastics part and hence to the delamination of the multicoat paint system.

This problem can be countered by using organic solvent based primers which bring about a certain partial dissolution or partial swelling of the plastics surface and hence better anchoring of the primer coat. However, the high solvent content may lead to damage to the plastics part as a result, for example, of microcracks. Moreover, in production, application, and curing, considerable quantities of solvents are released, which is no longer acceptable on environmental grounds.

It would be possible to prevent the delamination of hydroprimer coatings by baking the hydroprimer film at temperatures >100° C. This cannot be done, however, because of the absence of dimensional stability in the majority of plastics at these temperatures. Delamination of the hydroprimer coating can also be suppressed by flaming the surface of the plastics parts. This pretreatment, however, represents an additional step in the process and hence an additional cost factor and an additional source of error.

It is an object of the present invention to find a novel hydroprimer plastics parts which no longer has the disadvantages of the prior art but instead makes it possible to produce hydroprimer coatings for multicoat paint systems which adhere firmly, without delamination, even to unflamed plastics surfaces, and do so after thermal cure at temperatures <100° C. and which permit or assist the subsequent electrostatic spray application of solid color topcoat materials, basecoat materials and/or clearcoat materials. Moreover, as part of a multicoat color and/or effect paint system, the primer coatings ought to have excellent intercoat adhesion. Accordingly, the novel hydroprimer for plastics has been found which comprises I) at least one component comprising
  A) at least one aqueous polyurethane dispersion
  B) at least one electrically conductive pigment; and
II) at least one component comprising at least one polyisocyanate, at least one of the components I and II comprising at least one aromatic solvent (D).

Below, the novel electrically conductive hydroprimer for plastics is referred to as "hydroprimer of the invention".

Also found has been the novel process for producing multicoat color and/or effect paint systems on plastics parts by 1a) applying the hydroprimer of the invention and heat curing the resultant hydroprimer film to give the electrically conductive hydroprimer coating; or alternatively 1b) applying the hydroprimer of the invention, drying the resultant electrically conductive hydroprimer film, applying a light-colored hydroprimer film, and jointly heat curing the resultant electrically conductive hydroprimer film and the light-colored hydroprimer film, to give the electrically conductive hydroprimer coat and the light-colored hydroprimer coat; and 2a) applying a solid-color topcoat material and heat curing the resultant solid-color topcoat film to give a solid-color topcoat; or alternatively 2b) applying an aqueous basecoat material and partially drying the resultant aqueous basecoat film, and 3) applying a clearcoat material and subjecting the resultant clearcoat film and the aqueous basecoat film to a joint heat cure or a heat cure and a cure with actinic light, to give the basecoat and the clearcoat.

Below, the novel process for producing multicoat color and/or effect paint systems on plastics parts is referred to for the sake of brevity as "process of the invention". In addition, the novel multicoat color and or effect paint system for plastics parts has been found, which comprises the following coats atop one another in the stated sequence:

1a) a hydroprimer coating of the invention or alternatively
1a) a hydroprimer coating of the invention and
1b) a light-colored hydroprimer coating, and
2a) a solid-color topcoat or alternatively
2b) a basecoat, and
3) a clearcoat.

Below, the novel multicoat color and or effect paint system for plastics parts is referred to as "multicoat paint system of the invention".

Not least there have been found the novel plastics parts which are coated with at least one multicoat paint system of the invention and/or with at least one multicoat paint system produced by the process of the invention and which are referred to below as plastics parts of the invention. Further subject matter of the invention will emerge from the description which follows.

In the light of the prior art it was surprising and unforeseeable for the skilled worker that the object of the present invention can be achieved specifically by adding comparatively small amounts of an aromatic solvent to the hydroprimer of the invention. In particular it was surprising that this measure solved the problems of adhesion not only between the plastics parts and the hydroprimer coating but also between the hydroprimer coating and the other coatings present thereon, especially the light-colored hydroprimer coating, the solid-color topcoat or the basecoat/clearcoat, and did so when a curing temperature ≦100° C. was employed. In this context it proves to be a further surprising advantage of the hydroprimer of the invention that it does not cause any damage to the plastics parts as a result, for example, of microcracking and of the emission of organic compounds during handling and curing of the hydroprimer of the invention is not significantly increased as compared with conventional hydroprimers.

The hydroprimer of the invention is a two-component or multicomponent system, in particular a two-component system.

In the context of the present invention, this means a coating material in which in particular the binder, especially the aqueous binder dispersion, and the crosslinking agent are present separately from one another in at least two components which are not combine d until shortly before application. This form is chosen when binder, especially the aqueous binder dispersion, and crosslinking agent react with one another even at temperatures ≦100° C., in particular at room temperature. Coating materials of this kind are employed in particular for coating heat sensitive substrates such as plastic s parts.

The hydroprimer of the invention accordingly comprises at least one, especially one, component I and also at least one, especially one, component II, or consists of these components.

Component I includes as an essential constituent at least one, especially one polyurethane dispersion (A).

Suitable polyurethane dispersions (A) are customary and known and are available commercially. As is known, they comprise at least one water-soluble or -dispersible polyurethane (A), which comprises, in particular, polyester-polyurethanes (A).

Suitable polyester-polyurethanes (A) normally contain (potentially) cationic functional groups (a11) or (potentially) anionic functional groups (a12). Instead of these functional groups or in addition to them they may contain nonionic functional groups (a13) based on polyalkylene ethers.

Examples of suitable functional groups (a11) for inventive use which can be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (a11) for inventive use are primary, secondary, tertiary or quaternary ammonium groups, tertiary sulfonium groups or quaternary phosphonium groups, preferably quaternary ammonium groups or tertiary sulfonium groups, but especially quaternary ammonium groups.

Examples of suitable functional groups (a12) for inventive use which can be converted into anions by neutralizing agents are carboxylic acid, sulfonic acid or phosphonic acid groups, especially carboxylic acid groups.

Examples of anionic groups (a12) for inventive use are carboxylate, sulfonate or phosphonate groups, especially carboxylate groups.

Groups (a11) or (a12) should be selected in such a way that no disruptive reactions, in particular no unwanted complexation and/or salt formation and/or crosslinking reaction, occur with the other constituents of component I or other constituents of the hydroprimer of the invention. The skilled worker is therefore able to make the selection in a simple manner on the basis of his or her art knowledge.

Examples of suitable neutralizing agents for functional groups (a11) which can be transformed into cations include inorganic and organic acids such as sulfuric acid, hydrochloric acid, phosphoric acid, formic acid, acetic acid, lactic acid, dimethylolpropionic acid or citric acid, especially formic acid, acetic acid or lactic acid.

Examples of suitable neutralizing agents for functional groups (a12) which can be transformed into anions include ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine, triethanolamine, and the like.

In general the amount of neutralizing agent is chosen so that from 1 to 100 equivalents, preferably from 50 to 90 equivalents, of the functional groups (a11) or (a12) of the polyester-polyurethane (A) are neutralized.

The polyester-polyurethanes (A) are obtained by reacting
polyesterpolyols and
compounds which introduce the stabilizing (potentially) ionic groups (a11) or (a12) and/or the nonionic functional groups (a13), and if desired
polyamines and
amino alcohols
with polyisocyanates.

The polyesterpolyols are obtainable by reacting
unsulfonated or sulfonated saturated and/or unsaturated polycarboxylic acids or their esterifiable derivatives, together if desired with monocarboxylic acids, and
saturated and/or unsaturated polyols, together if desired with monools.

Examples of suitable polycarboxylic acids are aromatic, aliphatic, and cycloaliphatic polycarboxylic acids. It is preferred to use aromatic and/or aliphatic, especially aromatic, polycarboxylic acids.

Examples of suitable aromatic polycarboxylic acids are phthalic acid, isophthalic acid, terephthalic acid, phthalic, isophthalic or terephthalic monosulfonate, or halophthalic acids, such as tetrachlorophthalic or tetrabromophthalic acid, of which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid, dodecanedicarboxylic acid or dimer fatty acids or maleic acid, fumaric acid or itaconic acid, of which adipic acid, glutaric acid, azelaic acid, sebacic acid, dimer fatty acids, and maleic acid are advantageous and are therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids can be used both in their cis form and in their trans form, and also as a mixture of both forms.

Also suitable are the esterifiable derivatives of the abovementioned polycarboxylic acids, such as, for example, their monoesters or polyesters with aliphatic alcohols having from 1 to 4 carbon atoms or polyols having from 1 to 4 carbon atoms. It is also possible, furthermore, to use the anhydrides of the abovementioned polycarboxylic acids, where they exist.

If desired it is possible together with the polycarboxylic acids to use monocarboxylic acids as well, such as benzoic acid, tert-butylbenzoic acid, lauric acid, isononanoic acid, fatty acids of naturally occurring oils, acrylic acid, methacrylic acid, ethacrylic acid or crotonic acid, for example. A preferred monocarboxylic acid used is isononanoic acid.

Examples of suitable polyols are diols and triols, especially diols. Normally triols are used alongside the diols in minor amounts in order to introduce branching into the polyesterpolyols.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, or the positionally isomeric diethyloctanediols. These diols may also be used per se for preparing the polyurethanes (A) for inventive use.

Further examples of suitable diols are diols of the formula I or II:

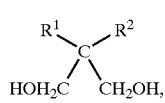

in which $R^1$ and $R^2$ each represent an identical or different radical and stand for an alkyl radical having from 1 to 18 carbon atoms, an aryl radical or a cycloaliphatic radical, with the proviso that $R^1$ and/or $R^2$ must not be methyl;

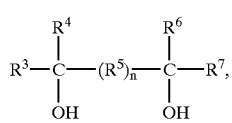

in which $R^3$, $R^4$, $R^6$, and $R^7$ each represent identical or different radicals and stand for an alkyl radical having from 1 to 6 carbon atoms, a cycloalkyl radical or an aryl radical and $R^5$ represents an alkyl radical having from 1 to 6 carbon atoms, an aryl radical or an unsaturated alkyl radical having from 1 to 6 carbon atoms, and n is either 0 or 1.

Suitable diols I of the general formula I include all propanediols of the formula in which either $R^1$ or $R^2$ or $R^1$ and $R^2$ is not equal to methyl, such as, for example, 2-butyl-2-ethylpropane-1,3-diol, 2-butyl-2-methylpropane-1,3-diol, 2-phenyl-2-methylpropane-1,3-diol, 2-propyl-2-ethylpropane-1,3-diol, 2-di-tert-butylpropane-1,3-diol, 2-butyl-2-propylpropane-1,3-diol, 1-dihydroxyrethylbicyclo(2.2.1-heptane, 2,2-diethylpropane-1,3-diol, 2,2-dipropylpropane-1,3-diol or 2-cyclohexyl-2-methylpropane-1,3-diol, and others.

As diols II of the general formula II it is possible, for example, to use 2,5-dimethylhexane-2,5-diol, 2,5-diethylhexane-2,5-diol, 2-ethyl-5-methylhexane-2,5-diol, 2,4-dimethylpentane-2,4-diol, 2,3-dimethylbutane-2,3-diol, 1,4-(2'-hydroxypropyl)benzene and 1,3-(2'-hydroxypropyl)benzene.

Of these diols, hexanediol and neopentyl glycol are particularly advantageous and are therefore used with particular preference.

The aforementioned diols may also be used per se for preparing the polyester-polyurethanes.

Examples of suitable triols are trimethylolethane, trimethylolpropane or glycerol, especially trimethylolpropane.

The aforementioned triols may also be used per se for preparing the polyester-polyurethanes (cf. patent EP-A-0 339 433).

If desired, minor amounts of monools may be used as well. Examples of suitable monools are alcohols or phenols such as ethanol, propanol, n-butanol, sec-butanol, tert-butanol, amyl alcohols, hexanols, fatty alcohols, allyl alcohol or phenol.

The polyesterpolyols may be prepared in the presence of small amounts of a suitable solvent as azeotrope former. Examples of azeotrope formers used include aromatic hydrocarbons, such as in particular xylene and (cyclo) aliphatic hydrocarbons, e.g., cyclohexane or methylcyclohexane.

Further examples of suitable polyols are polyesterdiols obtained by reacting a lactone with a diol. They are notable for the presence of terminal hydroxyl groups and repeating polyester fractions of the formula —(—CO—(CHR$^8$)$_m$—CH$_2$—O—)—. In this formula the index m is preferably from 4 to 6 and the substituent $R^8$=hydrogen or an alkyl, cycloalkyl or alkoxy radical. No substituent contains more than 12 carbon atoms. The total number of carbon atoms in the substituent does not exceed 12 per lactone ring. Examples thereof are hydroxycaproic acid, hydroxybutyric acid, hydroxy-decanoic acid and/or hydroxystearic acid.

Preferred for the preparation of the polyesterdiols is the unsubstituted ε-caprolactone, in which m has the value 4 and all $R^8$ substituents are hydrogen. The reaction with lactone is started by low molecular mass polyols such as ethylene glycol, 1,3-propanediol, 1,4-butanediol or dimethylolcyclohexane. It is, however, also possible to react other reaction components, such as ethylenediamine, alkyldialkanol-amine or else urea, with caprolactone. Further suitable diols of relatively high molecular mass include polylactamdiols, which are prepared by reacting, for example, ε-caprolactam with low molecular mass diols.

Polyetherpolyols, in particular those having a number average molecular weight of from 400 to 5000, in particular from 400 to 3000, can be used alongside the polyesterpolyols described above. Examples of highly suitable polyetherdiols are those of the general formula H—(—O—(CHR$^9$)$_o$—)$_p$OH, where the substituent $R^9$=hydrogen or a lower, optionally substituted, alkyl radical, the index o=2 to 6, preferably 3 to 4, and the index p=2 to 100, preferably 5 to 50. Especially suitable examples include linear or branched polyetherdiols such as poly(oxyethylene) glycols, poly-(oxypropylene) glycols, and poly(oxybutylene) glycols.

The polyetherdiols should on the one hand not introduce excessive amounts of the ether groups, since otherwise the polyurethanes formed start to swell in water. On the other hand, they can be used in amounts which ensure the nonionic stabilization of the polyurethanes. In that case they serve as in-chain functional nonionic groups (a13).

(Potentially) cationic functional groups (a11) are introduced via the incorporation of compounds which contain in the molecule at least one, in particular two, groups which are reactive toward isocyanate groups, and at least one group which is capable of forming cations; the amount to be used can be calculated from the target amine number.

Suitable groups which are reactive toward isocyanate groups are, in particular, hydroxyl groups and also primary and/or secondary amino groups, of which the hydroxyl groups are used with preference.

Examples of suitable compounds of this kind are 2,2-dimethylolethyl- or -propylamine, which have been blocked with a ketone, the resulting ketoxime group being hydrolyzed again before the cationic group (b11) is formed, or N,N-dimethyl-, N,N-diethyl- or N-methyl-N-ethyl-2,2-dimethylolethyl- or -propylamine.

(Potentially) anionic groups (a12) are introduced into the polyurethane molecules by the incorporation of compounds which contain in the molecule at least one group which is reactive toward isocyanate groups and one group which is capable of forming anions; the amount to be used can be calculated from the target acid number.

Examples of suitable compounds of this kind are those which contain in the molecule two groups which are reactive toward isocyanate groups. Suitable groups which are reactive toward isocyanate groups are, in particular, hydroxyl groups, and also primary and/or secondary amino groups. Accordingly it is possible, for example, to use alkanoic acids having two substituents on the α-carbon atom. The substituent may be a hydroxyl group, an alkyl group or, preferably, an alkylol group. These alkanoic acids have at least one, generally from 1 to 3, carboxyl groups in the molecule. They have from 2 to about 25, preferably from 3 to 10, carbon atoms. Examples of suitable alkanoic acids are dihydroxypropionic acid, dihydroxysuccinic acid, and dihydroxybenzoic acid. One particularly preferred group of alkanoic acids are the α,α-dimethylolalkanoic acids of the general formula $R^{10}$—C(CH$_2$OH)$_2$COOH, in which $R^{10}$ stands for a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimenthylolpentanoic acid. The preferred dihydroxyalkanoic acid is 2,2-dimethylolpropionic acid. Examples-of compounds containing amino groups are α,δ-diaminovaleric acid, 3,4-diaminobenzoic acid, 2,4-diaminotoluenesulfonic acid, and 2,4-diaminodiphenyl ether sulfonic acid.

Nonionic stabilizing poly(oxyalkylene) groups (a13) may be introduced as lateral or terminal groups into the polyurethane molecules. For this purpose it is possible, for example, to use alkoxypoly(oxyalkylene) alcohols with the general formula $R^{11}$O—(—CH$_2$—CH$^{12}$—O—)$_r$H in which $R^{11}$ stands for an alkyl radical having from 1 to 6 carbon atoms, $R^{12}$ for a hydrogen atom or an alkyl radical having from 1 to 6 carbon atoms, and the index r for a number between 20 and 75. (cf. patents EP-A-0 354 261 or EP-A-0 424 705).

Suitable polyisocyanates include in principle all of the customary and known polyisocyanates and polyisocyanate adducts that are used in the coatings field and are aliphatic, cycloaliphatic, aliphatic-cycloaliphatic, aromatic, aliphatic-aromatic and/or cycloaliphatic-aromatic, these also being referred to as paint polyisocyanates. Especially suitable polyisocyanates are diisocyanates.

Examples of suitable diisocyanates are isophorone diisocyanate (=5-isocyanato-1-isocyanatomethyl-1,3,3-trimethylcyclohexane), 5-isocyanato-1-(2-isocyanatoeth-1-yl)-1,3, 3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)-cyclohexane, 1-isocyanato-2-(3-isocyanatoeth-1-yl) cyclohexane, 1-isocyanato-2-(4-isocyanatobut-1-yl) cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-di isocyanatocyclohexane, 1,4-diisocyanatocyclohexane, dicyclohexylmethane 2,41-diisocyanate, dicyclohexylmnethane 4,4'-diiso-cyanate, liquid dicyclohexylmethane 4,4'-diisocyanate with a trans/trans content of up to 30% by weight, preferably 25% by weight, and in particular 20% by weight, which is obtainable by phosgenation of isomer mixtures of bis(4-aminocyclohexyl)methane or by fractional crystallization of commercial bis(4-isocyanatocyclohexyl)methane in accordance with patents DE-A-44 14 032, GB-A-1220717, DE-A-16 18 795 or DE-A-17 93 785, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate or diisocyanates derived from dimer fatty acids, such as are sold under the commercial designation DDI 1410 by Henkel and described in patents WO 97/49745 and WO 97/49747, especially 2-heptyl-3,4-bis(9-isocyanato-nonyl)-1-pentylcyclohexane, 1,2-, 1,4- or 1,3-bis(iso-cyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanato-but-1-yl)cyclohexane, m-tetramethylxylylene diisocyanate (=1,3-bis(2-isocyanatoprop-2-yl)benzene or tolylene diisocyanate.

Alongside the diisocyanates it is possible to use polyisocyanates of higher functionality, having a statistical average functionality of from 2.5 to 6, in particular from 2.5 to 5, in minor amounts. For the purposes of the present invention, minor amounts are amounts which do not lead to gelling of the polyester-polyurethanes (A).

Examples of suitable polyisocyanates of higher functionality are polyurethane prepolymers containing isocyanate groups, which can be prepared by reacting polyols with an excess of diisocyanates and are preferably of low viscosity. It is also possible to use polyisocyanates containing isocyanurate, biuret, allophanate, iminooxadiazinedione, urethane, urea, carbodiimide and/or uretdione groups. Polyisocyanates containing urethane groups, for example, are obtained by reacting some of the isocyanate groups with polyols, such as trimethylolpropane and glycerol, for example. It is preferred to use the diisocyanates described in detail above.

Very particular preference is given to using mixtures of polyisocyanate adducts which contain uretdione and/or isocyanurate and/or allophanate groups and are based on hexamethylene diisocyanate, such as are formed by catalytic oligomerization of hexamethylene diisocyanate using appropriate catalysts.

Gelling may also be prevented by using chain-terminating monoisocyanates in addition. Examples of suitable monoisocyanates are hexyl isocyanate, nonyl isocyanate, lauryl isocyanate, stearyl isocyanate or phenyl isocyanate.

The use of polyols, polyamines, and amino alcohols leads to an increase in the molecular weight of the polyurethanes (A).

Suitable polyols for the chain extension are polyols having up to 36 carbon atoms per molecule such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di-trimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A or mixtures thereof (cf. patents EP-A-0 399 433, EP-A-0 436 941, EP-A-0 517 707).

Examples of suitable polyamines contain at least two primary and/or secondary amino groups. Polyamines are essentially alkylene polyamines having from 1 to 40 carbon atoms, preferably from about 2 to 15 carbon atoms. They may carry substituents which have no hydrogen atoms that are reactive with isocyanate groups. Examples are polyamines having a linear or branched aliphatic, cycloaliphatic or aromatic structure and containing at least two primary amino groups.

Diamines include hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophorone-diamine, 4,4'-diaminodicyclohexylmethane, and amino-ethylenothanolamine. Preferred diamines are hydrazine, alkyl- or cycloalkyldiamines such as propylenediamine and 1-amino-3-aminomethyl-3,5,5-trimethylcyclohexane.

It is also possible to use polyamines containing more than two amino groups in the molecule. In these cases, however, it should be ensured—by using monoamines as well, for example—that crosslinked polyurethane resins are not obtained. Polyamines of this kind which can be used are diethylenetriamine, triethylenetetramine, dipropylenediamine, and dibutylenetriamine. An example of a monoamine that may be mentioned is ethylhexylamine (cf. patent EP-A-0 089 497).

Examples of suitable amino alcohols are ethanolamine, diethanolamine or triethanolamine.

The polyurethanes may contain terminal and/or lateral olefinic unsaturated groups. Groups of this kind can be introduced, for example, with the aid of compounds which contain at least one isocyanate-reactive group, especially hydroxyl group, and at least one vinyl group. Examples of suitable compounds of this kind are trimethylolpropane monoallyl ether or trimethylol-propane mono(meth) acrylate.

The polyurethanes (A) may be grafted with ethylenically unsaturated compounds. Examples of suitable polyurethanes (A) for use in accordance with the invention which are present as graft copolymers are known from patents EP-A-0 521 928, EP-A-0 522 420, EP-A-0 522 419 or EP-A-0 730 613.

The preparation of the polyurethanes (A) has no special features in terms of its method but instead takes place in accordance with the customary and known methods of polyurethane chemistry.

For preparing the hydroprimer of the invention the polyurethanes are neutralized with the neutralizing agents described above and dispersed in water to give a dispersion having a solids content of preferably from 10 to 70%, more preferably from 20 to 60%, with particular preference from 25 to 50%, and in particular from 30 to 45% by weight, based in each case on the dispersion.

The further essential constituent of component I of the hydroprimer of the invention is at least one electrically conductive pigment (B). Examples of suitable electrically conductive pigments (B) are metal pigments, conductivity blacks, doped pearlescent pigments or conductive barium sulfate. Especially suitable electrically conductive pigments are the conductivity blacks. For further details, refer to R ömpp Lexikon Lacke und Druckfarben, Georg Thieme Verlag, Stuttgart, N.Y., 1998, "metal pigments", p. 381 and "conductive pigments", p. 354.

The amount of electrically conductive pigments (B) in the hydroprimer of the invention may vary very widely and is preferably from 0.01 to 10%, more preferably from 0.1 to 8%, with particular preferably from 0.5 to 7%, with very particular preference from 0.5 to 6%, and in particular from 0.5 to 5% by weight, based in each case on the total amount of the hydroprimer of the invention.

The hydroprimer of the invention may comprise customary coatings additives (C) in effective amounts. Examples of suitable additives (C) are organic and/or inorganic pigments, anticorrosion pigments and/or fillers such as calcium sulfate, barium sulfate, silicates such as talc, bentonite or kaolin, silicas, oxides such as aluminum hydroxide and magnesium hydroxide, nanoparticles, organic fillers such as textile fibers, cellulose fibers, polyethylene fibers or wood flour, titanium dioxide, carbon black, iron oxide, zinc phosphate or lead silicate; these additives may also be incorporated into the hydroprimers of the invention by way of pigment pastes;

free radical scavengers;

organic corrosion inhibitors;

crosslinking catalysts such as organic and inorganic salts and complexes of tin, lead, antimony, bismuth, iron or manganese, preferably organic salts and complexes of bismuth and of tin, especially bismuth lactate, ethylhexanoate or dimethylolpropionate, dibutyltin oxide or dibutyltin dilaurate;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorous compounds, carboxylic monoesters, phosphates, polyacrylic acids and their copolymers, or polyurethanes;

adhesion promoters;

leveling agents;

film-forming auxiliaries such as cellulose derivatives;

flame retardants;

low molecular mass, oligomeric, and high molecular mass reactive diluents which may participate in thermal crosslinking, especially polyols such as tricyclodecanedimethanol, dendrimeric polyols, hyperbranched polyesters, polyols based on metathesis oligomers or branched alkanes having more than eight carbon atoms in the molecule;

anticrater agents;

water-miscible organic solvents and/or rheology control additives, such as those from patents WO 94/22968, EP-A-0 276 501, EP-A-0 249 201 or WO 97/12945; crosslinked polymeric microparticles, such as those disclosed, for example, in EP-A-0 008 127; inorganic phyllosilicates, preferably smectites, especially montmorillonites and hectorites, such as aluminum magnesium silicates, sodium magnesium phyllosilicates and sodium magnesium fluorine lithium phyllosilicates of the montmorillonite type or inorganic phyllosilicates such as aluminum magnesium silicates, sodium magnesium phyllosilicates and sodium magnesium fluorine lithium phyllosilicates of the montmorillonite type (for further details, refer to the book by Johan Bielemann "Lackadditive" [Additives for coatings], Wiley-VCH, Weinheim, New York, 1998, pages 17 to 30); silicas such as Aerosils; or synthetic polymers containing ionic and/or associative groups such as polyvinyl alcohol, poly(meth)acrylamide, poly (meth)acrylic acid, polyvinylpyrrolidone, styrenemaleic anhydride copolymers or ethylene-maleic anhydride copolymers and their derivatives or hydrophobically modified polyacrylates; or polyurethane-based associative thickeners, as described in Römpp Lexikon Lacke und Druckfarben, Georg Thieme Verlag, Stuttgart, N.Y., 1998, "thickeners", pages 599 to 600, and in the textbook "Lackadditive" by Johan Bieleman, Wiley-VCH, Weinheim, N.Y., 1998, pages 51 to 59 and 65;

Further examples of suitable coatings additives are described in the textbook "Lackadditive" by Johan Bieleman, Wiley-VCH, Weinheim, New York, 1998.

Component II of the hydroprimer of the invention comprises or consists of at least one polyisocyanate.

Examples of suitable polyisocyanates are those described above.

Preference is given to using the polyisocyanates having from 2.5 to 6, in particular from 2.5 to 5, isocyanate groups per molecule. These polyisocyanates, advantageously, are liquid and advantageously have viscosities of from 100 to 10,000, preferably from 100 to 5000, and in particular— where manual mixing of components I and II is envisaged—from 1000 to 2000 mPas (at 23° C.). If desired, small amounts of organic solvent, preferably from 1 to 25% by weight based on straight polyisocyanate, may be added to the polyisocyanates in order thereby to improve the ease of incorporation of the isocyanate and, where appropriate, to lower the viscosity of the polyisocyanate to a level within the abovementioned ranges. Examples of suitable solvent additives for the polyisocyanates are ethoxyethyl propionate, amyl methyl ketone or butyl acetate. Furthermore, the polyisocyanates may have been hydrophilically or hydrophobically modified in a customary and known manner.

In the hydroprimer of the invention, the ratio of component I to component II may vary very widely. It is guided in particular by the concentration of the isocyanate-reactive groups in component I, particularly in the polyurethane (A), especially in the polyester-polyurethane (A), and/or by the target crosslinking density for the hydroprimer coating of the invention. This ratio I:II is advantageously from 100:1 to 100:20, preferably from 100:2 to 100:15, with particular preference from 100:3 to 100:13, with very particular preference from 100:10 to 100:3.5, and in particular from 100:8 to 100:4.

The inventively essential constituent of the hydroprimer of the invention is at least one aromatic solvent (D). The aromatic solvent or solvent mixture is present in component I or in component II. It may also be present, however, in both components I and II. Which variant is given preference in each case depends primarily on the component in which the aromatic solvent (D) can best be dissolved or dispersed. The skilled worker is therefore able to determine the most favorable variant in each case on the basis of simple preliminary tests. In by far the majority of cases the addition of the aromatic solvent (D) to component I proves particularly advantageous and is therefore employed with particular preference.

Suitable aromatic solvents (D) include in principle all customary and known liquid aromatic compounds which do not undergo any unwanted reactions with the other constituents of the hydroprimer of the invention, especially the polyisocyanates, at the temperatures employed for preparing, storing, applying, and heat curing the hydroprimers of the invention.

Suitable aromatic solvents (D) are selected from the group consisting of mononuclear or polynuclear aromatics or heteroaromatics which are unsubstituted or are mono-, di- or trisubstituted by alkyl, cycloalkyl, perhaloalkyl, perhalocycloalkyl alkyloxy, cycloalkoxy and/or perhaloalkyloxy groups, it also being possible for said groups to be linked cyclically to the aromatic nucleus or nuclei, and also mononuclear or polynuclear aromatics or heteroaromatics which are mono-, di- or trisubstituted by nitrile and/or nitro groups and/or halogen atoms.

Examples of suitable alkyl groups are methyl, ethyl, propyl, isopropyl, n-butyl, isobutyl and tert-butyl groups.

Examples of suitable cycloalkyl groups are cyclopentyl and cyclohexyl groups.

Examples of suitable perhaloalkyl groups are trifluoromethyl, pentafluoroethyl, and nonafluorobutyl groups.

Examples of suitable alkoxy groups are methoxy, ethoxy, propyloxy, and butoxy groups.

Examples of suitable cycloalkoxy groups are cyclopentoxy and cyclohexoxy groups.

Examples of suitable perfluoroalkoxy groups are trifluoromethoxy, pentafluoroethoxy, and nonafluorobutoxy groups.

Examples of suitable cyclically linked groups are propane-1,3-diyl, butane-1,4-diyl, 1-oxabutane-1,4-diyl, 2-oxabutane-1,4-diyl, and 1,4-dioxabutane-1,4-diyl groups.

Examples of suitable halogen atoms are fluorine, chlorine or bromine.

As aromatic solvents (D) it is preferred to use mononuclear aromatics and/or heteroaromatics. With particular preference the aromatic nucleus comprises a benzene nucleus and the heteroaromatic nucleus comprises a thiophene, pyridine and/or triazine nucleus. Very particular preference is given to employing the benzene nucleus.

Examples of suitable aromatic solvents (D) based on the benzene nucleus are benzene, toluene, o-, m- and/or p-xylene, mesitylene, pseudocumene, hemellitene, ethylbenzene, cumene, p-cymene, tert-butylbenzene, chlorobenzene, o-, m- and/or p-dichlorobenzene, fluorobenzene, o-, m- and/or p-difluorobenzene, perfluorobenzene, nitrobenzene, benzonitrile, methoxybenzene, ethoxybenzene or thiophene, of which the xylenes are used with particular preference. Very particular preference is given to using technical grade mixtures of the xylenes containing traces of other alkylated aromatics. The strict xylene isomers, the isomer mixtures, and the technical grade mixtures are referred to as "xylene" in the context of the present invention.

The amount of aromatic solvents (D) in the hydroprimer of the invention may vary very widely. The general rule is not to use so much aromatic solvent (D) that the plastics parts are incipiently dissolved to an undesirably high extent. Furthermore, there must be no demixing or phase separation in the hydroprimer of the invention and/or in component I. The only lower limit on the fraction of aromatic solvents (D) is imposed by the consideration that it is necessary to use sufficient solvents (D) that the effect according to the invention occurs. Preference is given to using from 0.1 to 10%, more preferably from 0.15 to 8%, with particular preference from 0.2 to 6%, with very particular preference from 0.25 to 4%, and in particular from 0.3 to 2% by weight, based in each case on the hydroprimer of the invention, of aromatic solvents (D).

The preparation of the hydroprimer of the invention has no special features in terms of its method but instead takes place with the aid of customary and known mixing techniques and apparatus such as dissolvers and/or stirred mills.

The hydroprimer of the invention is used to produce the multicoat color and/or effect paint systems of the invention, employing in particular the process of the invention.

In accordance with the invention, the hydroprimer of the invention can be used in particular by the process of the invention to coat all plastics and plastics parts such as are commonly employed nowadays. Examples of such plastics are ABS, AMMA, ASA, CA, CAB, EP, UF, CF, MF, MPF, PF, PAN, PA, PE, HDPE, LDPE, LLDPE, UHMWPE, PC, PET, PMMA, PP, PS, SB, PUR, PVC, RF, SAN, PBT, PPE, POM, PUR-RIM, SMC, BMC, PP-EPDM, and UP (abbreviations to DIN 7728T1) and polymer blends thereof, especially PPE/PA, PC/PBT or PC/ABS, and fiber-reinforced plastics based thereon. It is a particular advantage of the hydroprimer of the invention and of the process of the invention that for purposes of better adhesion of the hydroprimer the plastics parts need no longer be pretreated by flaming or by plasma treatment.

The process of the invention starts from the application of the hydroprimer of the invention to the surface of the plastics part to be coated and heat curing of the resultant hydroprimer film to give the hydroprimer of the invention. In this step of the process and the subsequent step heat curing is preferably conducted at temperatures which pose no risk of deformation of the plastics parts. Preference is given to employing temperatures $\leq 100°$ C., in particular from 80 to 95° C.

Alternatively, in the first step of the process the hydroprimer of the invention is applied, the resultant electrically conductive hydroprimer film is dried, a light-colored hydroprimer film is applied wet on wet, and the resultant electrically conductive hydroprimer film and light-colored hydroprimer film are jointly heat cured to give the hydroprimer coating of the invention and the light-colored hydroprimer coating.

Examples of suitable light-colored hydroprimers for use in accordance with the invention are likewise two-component systems. Their component I comprises at least one hydroxyl-containing binder in solution or dispersion in water and at least one light-colored pigment, and their component II comprises at least one polyisocyanate. Suitable hydroxyl-containing binders include polyesters, polyacrylates, polyurethanes, acrylated polyesters and/or acrylated polyurethanes, especially polyurethanes. Examples of suitable polyurethanes are the above-described polyurethanes (A). Examples of suitable light-colored pigments are the above-described pigments (B) and (C) and also the pigments described below, insofar as they are light in color and opaque. Suitable components II include the components II described above. This variant of the process of the invention is employed when it is necessary to color match between the dark hydroprimer coating of the invention and the light-colored topcoat or basecoat.

In the second step of the process of the invention a solid-colored topcoat material is applied and the resultant solid-colored topcoat film is heat cured to give a solid-colored topcoat.

As an alternative to this, in the second process step an aqueous basecoat material is applied and the resultant aqueous basecoat film is partially dried and in the third process step a clearcoat material is applied (wet-on-wet technique) and the resultant clearcoat and the aqueous basecoat film are jointly heat cured or cured by means of heat and by means of actinic light (dual cure) to give the basecoat and the clearcoat.

In the context of the process of the invention, the clearcoat may also be further coated with an additional clearcoat material and the resultant clearcoat film may be cured thermally and/or with actinic radiation to give a highly mar resistant clearcoat (sealer).

Suitable aqueous basecoat materials comprise at least one hydroxyl-containing binder in solution or dispersion in water and at least one color and/or effect pigment. They may additionally comprise the above-described customary coatings additives (C) and also customary crosslinking agents in the known, effective amounts.

Suitable solid-color topcoat materials likewise comprise at least one hydroxyl-containing binder and at least one color and/or effect pigment. They may also further comprise the above-described customary coatings additives (C) and also customary crosslinking agents in the known, effective amounts.

In the context of the process of the invention it is preferred to employ aqueous basecoat materials.

Examples of suitable hydroxyl-containing binders are polyurethanes and/or acrylated polyurethanes, particularly the polyurethanes (A) described above.

The aqueous basecoat material may further comprise at least one hydroxyl-containing polyacrylate, hydroxyl-containing polyester and/or hydroxyl-containing acrylated polyester as additional binder(s)

Suitable color and/or effect pigments can be produced from organic or inorganic compounds. On the basis of this large number of suitable pigments, therefore, the aqueous basecoat material for inventive use ensures a universal scope for use and allows the realization of a large number of color shades and optical effects.

Effect pigments which can be used include metal plate pigments such as commercial aluminum bronzes, the chromated aluminum bronzes of DE-A-36 36 183, commercial stainless steel bronzes, and nonmetallic effect pigments, such as pearlescent pigments and interference pigments, for example. For further details refer to Römpp Lexikon Lacke und Druckfarben, Georg Thieme verlag, 1998, pages 176, "effect pigments" and pages 380 and 381 "metal oxide-mica pigments" to "metal pigments".

Examples of suitable inorganic color pigments are titanium dioxide, iron oxides, Sicotrans yellow, and carbon black. Examples of suitable organic color pigments are thioindigo pigments indanthrene blue, Chromophthal red, Irgazine orange, and Heliogen green. For further details refer to Römpp Lexikon Lacke und Druckfarben, Georg Thieme Verlag, 1998, pages 180 and 181, "iron blue pigments" to "black iron oxide", pages 451 to 453 "pigments" to "pigment volume concentration", page 563 "thioindigo pigments" and page 567 "titanium dioxide pigments".

The fraction of the pigments in the aqueous basecoat material and solid-colored topcoat may vary extremely widely and is guided primarily by the opacity of the pigments, the desired shade, and the desired optical effect. In the aqueous basecoat material of the invention the pigments are present in an amount of preferably from 0.5 to 50%, more preferably from 0.5 to 45%, with particular preference from 0.5 to 40%, with very particular preference from 0.5 to 35%, and in particular from 0.5 to 30% by weight, based in each case on the total weight of the aqueous basecoat material. The pigment/binder ratio, i.e., the ratio of the pigments to the polyurethanes and any other binders that may be present, may also vary extremely widely. This ratio is preferably from 6.0:1.0 to 1.0:50, more preferably from 5:1.0 to 1.0:50, with particular preference from 4.5:1.0 to 1.0:40, with very particular preference from 4:1.0 to 1.0:30, and in particular from 3.5:1.0 to 1.0:25.

These pigments may also be incorporated into the aqueous basecoat materials of the invention by way of pigment pastes, in which case the polyurethanes (A), inter alia, are suitable grinding resins.

Suitable starting compounds for preparing the polyurethanes are the compounds described above in connection with the preparation of the hydroprimers.

Examples of suitable crosslinking agents are amino resins, compounds or resins containing anhydride groups, compounds or resins containing epoxide groups, tris (alkoxycarbonylamino) triazines, compounds or resins containing carbonate groups, blocked and/or nonblocked polyisocyanates, beta-hydroxyalkylamides, and compounds containing on average at least two groups capable of transesterification, examples being products of the reaction between malonic diesters and polyisocyanates or between esters and partial esters of polyhydric alcohols of malonic acid and monoisocyanates, as described by European patent EP-A-0 596 460.

Examples of highly suitable aqueous basecoat materials and also the corresponding coatings are known from patents EP-A-0 089 497, EP-A-0 256 540, EP-A-0 260 447, EP-A-0 297 576, WO 96/12747, EP-A-0 523 610, EP-A-0 228 003, EP-A-0 397 806, EP-A-0 574 417, EP-A-0 531 510, EP-A-0 581 211, EP-A-0 708 788, EP-A-0 593 454, DE-A-43 28

092, EP-A-0 299 148, EP-A-0 394 737, EP-A-0 590 484, EP-A-0 234 362, EP-A-0 234 361, EP-A-0 543 817, WO 95/14721, EP-A-0 521 928, EP-A-0 522 420, EP-A-0 522 419, EP-A-0 649 865, EP-A-0 536 712, EP-A-0 596 460, EP-A-0 596 461, EP-A-0 584 818, EP-A-0 669 356, EP-A-0 634 431, EP-A-0 678 536, EP-A-0 354 261, EP-A-0 424 705, WO 97/49745, WO 97/49747, EP-A-0 401 565, EP-B-0 730 613 or WO 95/14721.

Particular advantages are afforded by physically curing aqueous basecoat materials, which are therefore employed with preference in accordance with the invention.

Examples of suitable clearcoat materials are two-component clearcoat materials. As is known, the two component clearcoat materials comprise a component I having at least one hydroxyl-containing binder and a component II having at least one polyisocyanate. Until they are used in unison, components I and II are stored separately from one another.

Examples of suitable polyisocyanates are those described above.

Examples of suitable hydroxyl-containing binders are oligomeric or polymeric, random, alternating and/or blocked, linear and/or branched and/or comb, addition (co) polymers of ethylenically unsaturated monomers or polyaddition resins and/or polycondensation resins. For further details of these terms refer to Römpp Lexikon Lacke und Druckfarben, Georg Thieme Verlag, Stuttgart, New York, 1998, page 457, "polyaddition" and "polyaddition resins (polyadducts)" and also pages 463 and 464, "polycondensates", "polycondensation", and "polycondensation resins".

Examples of highly suitable addition (co)polymers are poly(meth)acrylates and partially hydrolyzed polyvinyl esters.

Examples of highly suitable polyaddition resins and/or polycondensation resins are polyesters, alkyds, polyurethanes, polylactones, polycarbonates, polyethers, epoxy resin-amine adducts, polyureas, polyamides or polyimides.

The hydroxyl-containing binders or resins for use in accordance with the invention are oligomers and polymers. In the context of the present invention, oligomers are resins which contain at least 2 to 15 repeating monomer units in their molecule. In the context of the present invention, polymers are resins which contain at least 10 repeating monomer units in their molecule. For further details of these terms refer to Römpp Lexikon Lacke und Druckfarben, Georg Thieme Verlag, Stuttgart, New York, 1998, "oligomers", page 425.

The hydroxyl-containing resins for use in accordance with the invention contain primary and/or secondary hydroxyl groups. It is a quite substantial advantage of the process of the invention that both kinds of hydroxyl groups can be used. This makes it possible to tailor the reactivity of the resins by playing on steric effects.

The OH number of the hydroxyl-containing resins for use in accordance for the invention may vary very widely and is preferably from 10 to 500, more preferably from 20 to 400, and in particular from 30 to 350 mg KOH/g.

The resin may further contain at least one functional group which on exposure to actinic radiation reacts with a group of its own kind or with another functional group. These functional groups may already be present in the hydroxyl-containing resins for use in accordance with the invention or may be introduced subsequently into the resins by means of polymer-analogous reactions.

Examples of suitable functional groups of this kind are allyl, vinyl acrylate or methacrylate groups, especially acrylate groups. The actinic radiation may comprise electromagnetic radiation such as X-rays, UV radiation, visible light or near IR (NIR) light, or corpuscular radiation such as electron beams.

Of the hydroxyl-containing binders described above, the poly(meth)acrylates, the polyesters, and the polyurethanes are used with preference. Particular advantages result from the joint use of the poly(meth)acrylates and of the polyesters.

Besides the binder and the polyisocyanates, the two-component clearcoat materials for use in accordance with the invention may further comprise the above-described customary coatings additives in the known, effective amounts. It is self-evident that the only additives employed here will be those which do not impair the transparency of the clearcoat. Further examples of suitable additives for clearcoat materials are crosslinking catalysts such as dibutyltin dilaurate, lithium decanoate or zinc octoate;

transparent fillers based on silicon dioxide, aluminum oxide, titanium dioxide or zirconium oxide; for further details refer to Römpp Lexikon Lacke und Druckfarben, Georg Thieme Verlag, Stuttgart, 1998, pages 250 to 252;

sag control agents such as ureas, modified ureas and/or silicas, as described, for example, in the references EP-A-192 304, DE-A-23 59 923, DE-A-18 05 693, WO 94/22968, DE-C-27 51 761, WO 97/12945 or "farbe +lack", 11/1992, pages 829 ff; and/or flatting agents such as magnesium stearate.

Examples of suitable clearcoat materials for producing highly mar resistant clearcoats are organically modified ceramic materials, which are sold, inter alia, under the brand name ORMOCER®.

In the context of the process of the invention, the coating materials described above may be applied by any customary application method, such as spraying, knife coating, spreading, flow coating, dipping, impregnating, trickling or rolling, for example. The plastics part to be coated may itself be at rest, with the application unit or equipment being moved. Alternatively, the plastics part to be coated may be moved, with the application unit being at rest relative to the substrate or being moved appropriately. The choice of which method to employ is guided primarily by the size of the substrate. Accordingly, a large plastics part will be coated first and foremost using movable application equipment.

Preference is given to using spray application methods, such as compressed air spraying, airless spraying, high speed rotation, electrostatic spray application (ESTA), together if desired with hot spray application such as hot air spraying, for example. Application can be conducted at temperatures of max. 70 to 80° C., so that suitable application viscosities are achieved without the coating material and its overspray, which may be intended for reprocessing, undergoing any change or damage during the short period of thermal exposure. Accordingly, hot spraying can be configured in such a way that the coating material is heated only very shortly in the spray nozzle or a short way upstream of the spray nozzle.

The spray booth that is used for application may be operated, for example, with an optionally temperature-controllable circulation system which is operated with a suitable absorption medium for the overspray, an example being the coating material itself.

Where the clearcoat material includes constituents which are crosslinkable with actinic radiation, application is carried out under illumination with visible light with a wavelength of more than 550 nm, or in the absence of light. This prevents material change or damage to the coating material and the overspray.

In general, the electrically conductive hydroprimer film and the light-colored hydroprimer film, the solid-colored topcoat film, the basecoat film, and the clearcoat film are applied in a wet film thickness such that curing thereof gives coats having the thicknesses which are necessary and advantageous for their functions. In the case of the hydroprimer coating of the invention this thickness is from 5 to 100, preferably from 10 to 80, with particular preference from 10 to 60, and in particular from 10 to 40 $\mu$m; in the case of the light-colored hydroprimer coat this thickness is from 5 to 100, preferably from 10 to 80, with particular preference from 10 to 60, and in particular from 10 to 40 $\mu$m; in the case of the topcoat it is from 5 to 90, preferably from 10 to 80, with particular preference from 15 to 60, and in particular from 20 to 50 $\mu$m; in the case of the basecoat it is from 5 to 50, preferably from 10 to 40, with particular preference from 12 to 30, and in particular from 15 to 25 $\mu$m; and in the case of the clearcoat it is from 10 to 100, preferably from 15 to 80, with particular preference from 20 to 70, and in particular from 25 to 60 $\mu$m.

Heat curing may take place after a certain rest period. This period may have a duration of from 30 s to 2 h, preferably from 1 min to 1 h, and in particular from 1 min to 45 min. The rest period serves, for example, for leveling and degassing of the paint films or for the evaporation of volatile constituents such as solvents. The rest period may be assisted and/or shortened by using elevated temperatures up to 90° C. and/or by a reduced air humidity <10 g water/kg air, especially <5 g water/kg air, provided this does not entail any damage or change to the paint films, such as premature complete crosslinking.

Heat curing has no special features in terms of its method but instead takes place in accordance with the customary and known methods such as heating in a forced air oven or irradiation using IR lamps. Heat curing may also take place in stages. Advantageously, heat curing is effected at a temperature from 50 to 100° C., with particular preference from 80 to 100° C., and in particular from 85 to 100° C., for a time of from 1 min up to 2 h, with particular preference from 2 min up to 1 h, and in particular from 3 min to 45 min.

Given an appropriate material composition of the coating material, heat curing may be supplemented by curing with actinic radiation, for which in particular UV radiation and/or electron beams may be used. If desired, it may be supplemented or carried out with actinic radiation from other radiation sources. In the case of electron beams it is preferred to operate under an inert gas atmosphere. This can be ensured, for example, by supplying carbon dioxide and/or nitrogen directly to the surface of the paint film.

In the case of UV radiation curing as well it is possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, which may have been doped with lead in order to open up a radiation window up to 405 nm, or electron beam sources. The arrangement of these sources is known in principle and may be adapted to the circumstances of the work piece and the process parameters. In the case of work pieces of complex shape, those regions not accessible to direct radiation (shadow regions) such as cavities, folds, and other structural undercuts may be cured using pointwise, small-area or all-round emitters in conjunction with an automatic movement means for the irradiation of cavities or edges.

The equipment and conditions for these curing methods are described, for example, in R. Holmes, "U.V. and E.B. Curing Formulations for Printing Inks", Coatings and Paints, SITA Technology, Academic Press, London, United Kingdom 1984.

Curing may take place here in stages, i.e., by multiple exposure to light or actinic radiation. It may also be done alternatingly, i.e., by curing alternately with UV radiation and electron beams.

Where heat curing and actinic radiation curing are employed together (dual cure), these methods may be employed simultaneously or alternatingly. Where the two curing methods are used alternatingly, it is possible, for example, to begin with the heat cure and end with the actinic radiation cure. In other cases it may prove advantageous to commence with the actinic radiation cure and end with it. The skilled worker is able to determine the method of curing that is particularly suitable for each individual case, on the basis of his or her general art knowledge with the assistance where appropriate of simple preliminary tests.

The multicoat color and/or effect paint system of the invention, obtained in particular by the process of the invention, comprises the following coats atop one another in the following sequence:

1a) a hydroprimer coating of the invention or alternatively 1a) a hydroprimer coating of the invention and 1b) a light-colored hydroprimer coating, and 2a) a solid-color topcoat or alternatively 2b) a basecoat, and 3) a clearcoat, and also, if desired, 4) a highly mar resistant clearcoat (sealer).

The multicoat color and/or effect paint systems of the invention exhibit an outstanding profile of properties which is very well balanced in terms of mechanics, optics, corrosion resistance, and adhesion, even at very low temperatures and/or following condensation exposure. Accordingly, the multicoat systems of the invention have the market's required high optical quality and intercoat adhesion, even in the steam jet test, and do not give rise to any problems such as deficient condensation resistance, cracking (mud cracking), leveling defects or surface textures.

In particular the multicoat paint system of the invention possesses an outstanding metallic effect, an outstanding D.O.I. (distinctiveness of the reflected image), and an outstanding surface smoothness. It is stable to weathering, resistant to chemicals and bird droppings, mar resistant, and exhibits very good reflow behavior.

A further key advantage is the very good overcoatability of the multicoat paint system of the invention, even without abrasion. As a result it can be coated easily with customary and known highly mar resistant coating materials based on organically modified ceramic materials.

Not least, however, it proves to be a very particular advantage that by means of the process of the invention it is possible to realize a multicoat paint system which is based predominantly on aqueous coating materials.

Accordingly, the plastics parts of the invention also have a relatively long service life, a better esthetic appearance, and improved technological usefulness, so making them particularly attractive economically.

EXAMPLE

The Preparation of an Inventive Hydroprimer and its use for Producing an Inventive Multicoat Color and Effect Paint System For producing the multicoat paint system of the invention, first of all component I of the inventive hydroprimer was prepared as follows:

In a dissolver, 32 parts by weight of a commercial polyester-polyurethane dispersion, 1.7 parts by weight of Aerosil, 1.3 parts by weight of a commercial electrically conductive carbon black, 6.0 parts by weight of a commercial 3% Bentone paste, 1.5 parts by weight of butyl glycol, 1.5 parts by weight of a 52% strength wetting agent solution, 23 parts by weight of titanium dioxide, 13 parts by weight of barium sulfate, 3.7 parts by weight of talc and 1.1 parts by weight of a commercial emulsifier were mixed with one another for 20 minutes and up to a temperature of 60° C. Thereafter, the resulting mixture was ground in a stirred mill (ZWM mill) to a particle size of from 12 to 14 μm (Hegman wedge 25). Subsequently, 10.2 parts by weight of water and one part by weight of xylene were added, to give the component I for inventive use.

Shortly before application, component I was mixed with a commercial cycloaliphatic polyisocyanate (Desmodur® N 3400 from Bayer AG) (component II) in a weight ratio I:II of 100:6, after which the resulting inventive hydroprimer was applied by pneumatic spray application in a dry film thickness of from 20 to 25 μm to plastics panels made of Noryl® GTX 964 (commercial blend of polyphenylene oxide and polyamide). The resultant hydroprimer film was flashed off at room temperature for 10 minutes and cured at a panel temperature of 90° C. for 30 minutes.

The resultant inventive hydroprimer coating was then coated with a commercial aqueous basecoat material, after which the resultant aqueous basecoat film was flashed off at room temperature for 10 minutes. Thereafter it was coated by the wet-on-wet technique with a commercial two-component clearcoat material, after which the aqueous basecoat film and clearcoat film were cured jointly at a panel temperature of 90° C. for 30 minutes.

After the panels had been aged at 60° C. for 2 days, they were subjected to the known DaimlerChrysler steam jet test. In the course of this test there were no instances of delamination whatsoever, which underlines the outstanding adhesion of the inventive hydroprimer to the plastics parts on the one hand and to the aqueous basecoat on the other.

COMPARATIVE EXPERIMENT

The Preparation of a Noninventive Hydroprimer and its use for Producing a Conventional Multicoat Color and Effect Paint System The example was repeated except that no xylene was added to the hydroprimer. In the comparative experiment, in contrast to the example, severe delamination occurred during the DaimlerChrysler steam jet test.

What is claimed is:

1. An electrically conductive hydroprimer for plastics comprising
   I) at least one component comprising
      A) at least one aqueous polyurethane dispersion and
      B) at least one electronically conductive pigment; and
   II) at least one component comprising at least one polyisocyanate,
   wherein at least one of the components I and II comprise
      at least one aromatic solvent that is at least one of mononuclear aromatic, polynuclear aromatic, mononuclear heteroaromatic, and/or polynuclear heteroaromatic,
   wherein the aromatic solvent is unsubstituted or is mono-, di-, or tri-substituted by at least one of an alkyl group, a cycloalkyl group, a perhaloalkyl group, a perhalocycloalkyl alkyloxy group, a cycloalkoxy group, a perhaloalkyloxy group, a nitrile group, a nitro group and/or a halogen atom, and
   optionally, wherein the alkyl group, the cycloalkyl group, the perhaloalkyl group, the perhalocycloalkyl alkyloxy group, the cycloalkoxy group, and/or the perhaloalkyloxy group can be linked cyclically to the aromatic nucleus or nuclei
   wherein the mononuclear aromatic is at least one of benzene, pseudocumene, hemellitene, ethyl-benzene, cumene, p-cymene, tert-butylbenzine, chlorobenzene, o-dichlorobenzene, m-dichlorobenzene, p-dichlorobenzene, flourobenzene, o-difluorobenzene, m-difluorobenzene, p-difluorobenzene, perfluorobenzene, nitrobenzene, benzonitrile, methoxybenzene, and/or ethoxybenzene.

2. The hydroprimer of claim 1, wherein the aromatic solvent is present in the hydroprimer in an amount from 0.1 to 10% by weight based on the total weight of the hydroprimer.

3. The hydroprimer of claim 1, wherein the aromatic solvent is selected from the group consisting of benzene, pseudocumene, hemellitene, ethyl-benzene, cumene, p-cymene, tert-butylbenzene, chlorobenzene, o-dichlorobenzene, m-dichlorobenzene, p-dichlorobenzene, fluorobenzene, o-difluorobenzene, m-difluorobenzene, p-difluorobenzene, perfluorobenzene, nitrobenzene, benzonitrile, methoxybenzene, ethoxybenzene, thiophene, and mixtures thereof.

4. The hydroprimer of claim 1, wherein the polyurethane dispersion comprises at least one polyester-polyurethane containing at least one of a cationic functional group; a functional group that can be converted into a cation by at least one of a neutralizing agent and a quaternizing agent; an anionic functional group; a functional group that can be converted into an anion by a neutralizing agent; and/or a nonionic functional group based on a polyalkylene ether.

5. The hydroprimer of claim 4, wherein the functional group that can be converted into a cation is at least one of a primary amino group, a secondary amino group, a tertiary amino group, a secondary sulfide group, and/or a tertiary phosphine group; wherein the cationic functional group is at least one of a secondary ammonium group, a tertiary ammonium group, a quaternary ammonium group, a tertiary sulfonium group, and/or a quaternary phosphonium group; wherein the functional group that can be converted into an anion is at least one of a carboxylic acid group, a sulfonic acid group, and/or a phosphonic acid group; and wherein the anionic functional group is at least one of a carboxylate group, a sulfonate group, and/or a phosphonate group.

6. The hydroprimer of claim 1, wherein the polyester-polyurethane comprises a reaction product of
   i) a polyesterpolyol
   ii) a compound that provides at least one of a cationic functional group; a functional group that can be converted into a cation by at least one of a neutralizing agent and a quaternizing agent; an anionic functional group; a functional group that can be converted into an anion by a neutralizing agent; and/or a nonionic functional group based on a polyalkylene ether, and
   iii) a polyisocyanate, and
   optionally at least one of a polyamine and an amino alcohol.

7. The hydroprimer of claim 1, wherein the polyester-polyol comprises a reaction product of
   i) at least one of a polycarboxylic acid and/or an esterifiable derivative of a polycarboxylic acid, and optionally further including a monocarboxylic acid, wherein i-a) the polycarboxylic acid is unsulfonated or sulfonated
i-b) the polycarboxylic acid is saturated or unsaturated
i-c) the esterifiable derivative of a polycarboxylic acid is unsulfonated or sulfonated, and
i-d) the esterifiable derivative of a polycarboxylic acid is saturated or unsaturated, and ii) at least one of a saturated polyol and/or an unsaturated polyol and optionally further including a monool.

8. The hydroprimer of claim 1, wherein the electrically conductive pigment is selected from the group consisting of a metal pigment, a conductivity black pigment, a doped pearlescent pigment, a conductive barium sulfate, and mixtures thereof.

9. The hydroprimer of claim 1, wherein the hydroprimer further comprises at least one of an electrically nonconductive pigment and/or a coatings additive.

10. The hydroprimer of claim 1, wherein the hydroprimer has a solids content of from 30% to 80% by weight based on the weight of the hydroprimer.

11. A process comprising applying the hydroprimer of claim 1 to a substrate to produce a multicoat paint system, wherein the paint system is one of a color paint system, an effect paint system, or a color and effect paint system.

12. A process for producing a multicoat paint system on a plastic part, wherein the paint system is one of a color paint system, an effect paint system, and a color and effect paint system, comprising I) applying the hydroprimer of claim 1 to the plastic part to provide a hydroprimer film, and one of
  Ia) heat curing the bydroprimer film to give an electrically conductive hydroprimer coating, or
  Ib) drying the hydroprimer film, applying a light-colored hydroprimer film, and jointly heat curing the hydroprimer film and the light-colored hydroprimer film to give an electrically conductive hydroprimer coat and a light-colored hydroprimer coat; and II) one of
  IIa) applying a solid-color topcoat material to form a film and heat curing the solid-color topcoat film to give a solid-color topcoat, or
  IIb) applying an aqueous basecoat material to form a film and partially drying the aqueous basecoat film, applying a clearcoat material, and curing the resultant clearcoat film and the aqueous basecoat film jointly to give a basecoat and a clearcoat, wherein the curing is one of i) heat curing or ii) heat curing and a curing with actinic light.

13. The process of claim 12 further comprising coating the clearcoat with a further clearcoat material to form a further clearcoat film and curing the further clearcoat film to give a mar resistant clearcoat, wherein the curing is one of i) heat curing or ii) heat curing and a curing with actinic light.

14. The process of claim 13, wherein the plastic part is one of an automobile body or a commercial vehicle cab.

15. The process of claim 13, wherein at least one of:

A. the aromatic solvent is present in the hydroprimer in an amount from 0.1 to 100% by weight based on the total weight of the hydroprimer;

B. the polyurethane dispersion comprises at least one polyester-polyurethane containing at least one of a cationic functional group; a functional group that can be converted into a cation by at least one of a neutralizing agent and a quaternizing agent; an anionic functional group; a functional group that can be converted into an anion by a neutralizing agent; and a nonionic functional group based on a polyalkylene ether;

C. the polyester-polyurethane comprises a reaction product of
  i) a polyesterpolyol
  ii) a compound that provides at least one of a cationic functional group; a functional group that can be converted into a cation by at least one of a neutralizing agent and a quaternizing agent; an anionic functional group; a functional group that can be converted into an anion by a neutralizing agent; and a nonionic functional group based on a polyalkylene ether, and
  iii) a polyisocyanate, and optionally at least one of a polyamine and an amino alcohol;

D. the polyesterpolyol comprises a reaction product of
  i) at least one of a polycarboxylic acid and an esterifiable derivative of a polycarboxylic acid, and optionally further including a monocarboxylic acid, wherein
    i-a) the polycarboxylic acid is unsulfonated or sulfonated
    i-b) the polycarboxylic acid is saturated or unsaturated,
    i-c) the esterifiable derivative of a polycarboxylic acid is unsulfonated or sulfonated, and
    i-d) the esterifiable derivative of a polycarboxylic acid is saturated or unsaturated, and
  ii) at least one of a saturated polyol and an unsaturated polyol and optionally further including a monool;

E. the electrically conductive pigment is selected from the group consisting of a metal pigment, a conductivity black pigment, a doped pearlescent pigment, a conductive barium sulfate, and mixture thereof;

F. the hydroprimer further comprises at least one of an electrically nonconductive pigment and a coatings additive; and/or G. the hydroprimer has a solids content of from 30% to 80% by weight based on the weight of the hydroprimer.

* * * * *